(12) United States Patent
Schneider et al.

(10) Patent No.: US 11,941,063 B2
(45) Date of Patent: Mar. 26, 2024

(54) SEMANTIC DISCOVERY

(71) Applicant: SAP SE, Walldorf (DE)

(72) Inventors: Judith Schneider, Sulzfeld (DE); Christian Grail, Zuzenhausen (DE); Joachim Fiess, Karlsruhe (DE); Guido Wagner, Rauenberg (DE); Johanna Wittig, Mühltal (DE)

(73) Assignee: SAP SE, Walldorf (DE)

( * ) Notice: Subject to any disclaimer, the term of this patent is extended or adjusted under 35 U.S.C. 154(b) by 406 days.

(21) Appl. No.: 16/856,155

(22) Filed: Apr. 23, 2020

(65) Prior Publication Data
US 2021/0334308 A1 Oct. 28, 2021

(51) Int. Cl.
*G06F 16/904* (2019.01)
*G06F 16/28* (2019.01)
*G06F 16/901* (2019.01)
*G06F 16/906* (2019.01)

(52) U.S. Cl.
CPC .......... *G06F 16/904* (2019.01); *G06F 16/288* (2019.01); *G06F 16/9024* (2019.01); *G06F 16/906* (2019.01)

(58) Field of Classification Search
CPC .... G06F 16/904; G06F 16/906; G06F 16/288; G06F 16/9024
See application file for complete search history.

(56) References Cited

U.S. PATENT DOCUMENTS

| | | | |
|---|---|---|---|
| 2007/0180408 A1* | 8/2007 | Rusu .................... | G06F 16/957 715/855 |
| 2010/0250526 A1* | 9/2010 | Prochazka .......... | G06F 16/9535 707/723 |
| 2019/0005024 A1* | 1/2019 | Somech ................ | G06F 16/243 |
| 2020/0005153 A1* | 1/2020 | Ramanath ............ | G06F 16/285 |
| 2020/0042567 A1* | 2/2020 | Birch .................... | G06F 40/134 |
| 2020/0074322 A1* | 3/2020 | Chungapalli .......... | G06N 20/20 |
| 2020/0226156 A1* | 7/2020 | Borra .................. | G06F 16/9024 |
| 2020/0401908 A1* | 12/2020 | Ortega ................ | G06V 10/762 |

* cited by examiner

*Primary Examiner* — Albert M Phillips, III
*Assistant Examiner* — Courtney Harmon
(74) *Attorney, Agent, or Firm* — Sterne, Kessler, Goldstein & Fox P.L.L.C.

(57) ABSTRACT

Disclosed herein are system, method, and device embodiments for implementing semantic discovery. An embodiment operates by retrieving a plurality of entities from a database instance. A semantic graph representation of the plurality of entities is generated within a graphical user interface. Context information is received from a user. A focus node is determined from the plurality of nodes using the context information. A semantic context of the focus node is determined, wherein the semantic context includes the focus node, a subset of the plurality of nodes, and subset of the plurality of edges. Responsive to the receiving, a visual indication of the semantic context is displayed within the graphical user interface.

20 Claims, 6 Drawing Sheets

SEMANTIC DISCOVERY

BACKGROUND

Some database management systems (DBMS) present graphical user interfaces (GUI) displaying database information. Often the database information is presented as it is stored within the database. For instance, a DBMS may merely display the tables of the database or a graph representation of the tables of the database. However, in many instances, limited display sizes and high amounts of database information make it difficult for an operator to identify and synthesize relationships of note within the database information, and require an operator to perform cumbersome navigation operations within the GUI to ascertain relationships of note within the database information.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for implementing semantic discovery.

Figure 1:
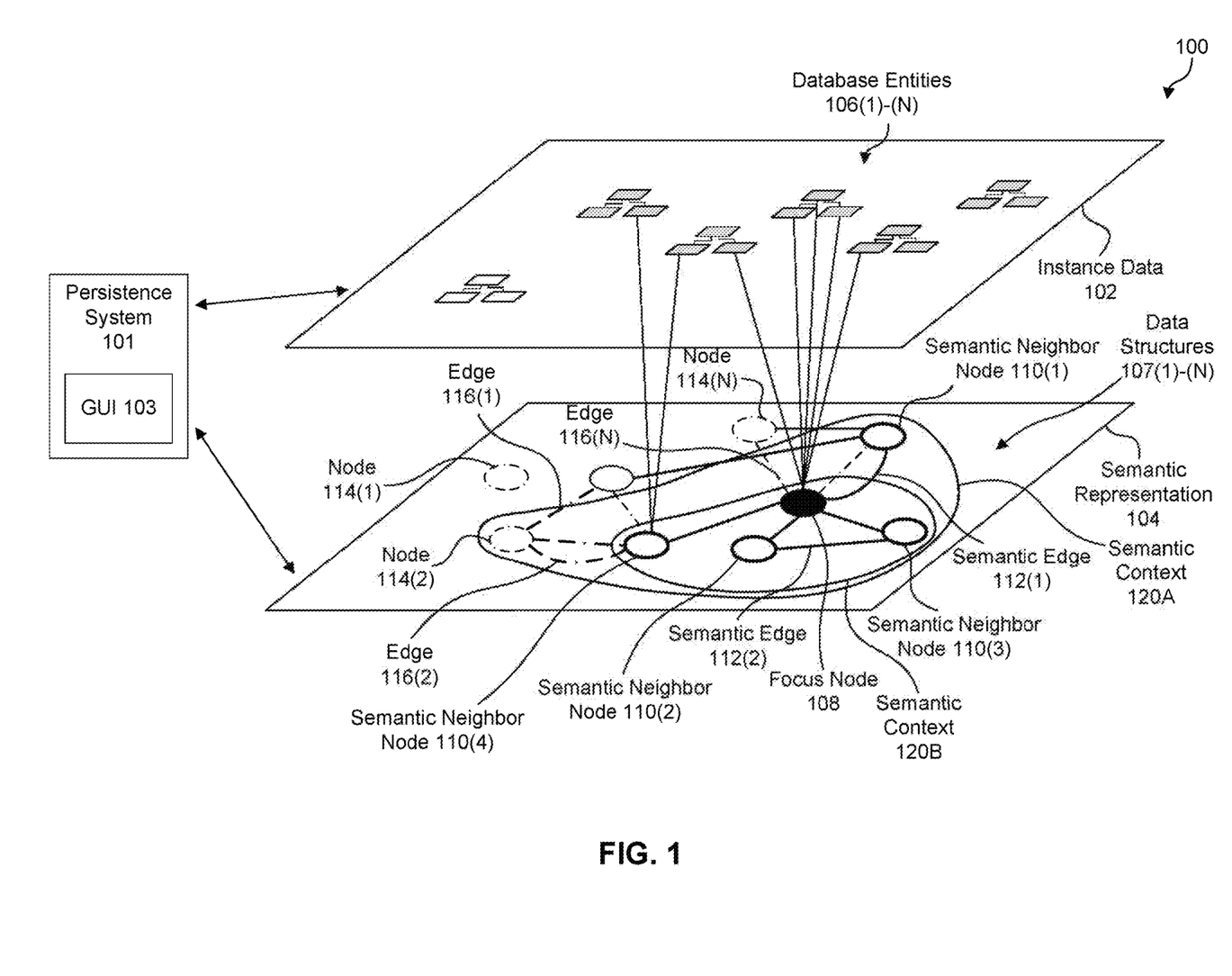
FIG. 1 is a diagram of a relationship between instance data of a persistence system and a semantic representation of the instance data, according to some embodiments.

FIG. 1 illustrates a block diagram of a persistence system 101 and an exemplary relationship between instance data and a semantic representation of the instance data, according to some embodiments of the present disclosure.

As illustrated in FIG. 1, persistence system 101 may represent the instance data 102 as the semantic representation 104. Persistence system 101 may refer to a processing or software system that handles the storage, retrieval, and updating of data in a database (e.g., a database management system). As used herein, a "database" may refer to an organized collection of data. In some embodiments, a database may include a plurality of data tables comprising data values (e.g., alphanumeric strings, integers, decimals, floating points, dates, times, binary values, Boolean values, and/or enumerations). Some examples of databases include columnar databases, relational databases, key-store databases, graph databases, and document stores.

Further, as used herein, "instance data" may refer to database objects and database schema information. Some examples of database objects include database entities, database tables, table functions, database views, hierarchies, or stored procedures. The instance data 102 may be stored on a single computing system or distributed across a plurality of computing systems. In addition, the instance data 102 may be application data for a single application or a plurality of applications. Additionally, in some embodiments, the instance data 102 may be stored in multiple databases. In one implementation, the instance data 102 is the data entered and express relationships of certain fields of that data. As an example, a name of an employee and an employee ID number are data fields that are a) entered by a system user and b) related to each other by the construction of the instance data 102.

As described in detail herein, persistence system 101 may generate the semantic representation 104 based on the instance data 102, and display the semantic representation 104 to a user via a graphical user interface (GUI) 103. Once the semantic representation 104 is displayed to the user within the GUI 103, the user may navigate the semantic representation 104 to visually consume the information stored in the instance data 102. For instance, a user may employ the semantic representation 104 to search the instance data 102 or discover relationships within the instance data 102. In one implementation, the semantic data 104 includes a subset of instance data 102. In other implementations, semantic data 104 includes inferred or generated relationships about the instance data 102 that are not expressly described by the data or data schema of the instance data 102. In yet other implementations, semantic data 104 may include combinations of both.

As an example, a query of "John Smith" using context information "as an author" may yield a book written by John Smith as Focus Node 108 whereas "John Smith" within the context information of "background investigation" may yield his web page from his current employer as Focus Node 108. These may be direct copies of data entities 106 from Instance Data 102. However, a query of "John Smith" with context information "history" might yield a focus node that includes data about his book and data about his current employer combined together into Focus Node 108 that is not a direct copy of a database entity 106.

In an embodiment, GUI 103 may include a touchscreen or other visual display interface that is configured to display semantic representation 104 of persistence system 101. In an embodiment, GUI 103 may further be able receive user input (e.g., through a user navigating semantic representation 104 or provided other context information) that is provided back to persistence system 101 for processing.

Suppose the instance data 102 includes census and tax information for a geographic locale. The instance data 102 may include demographic information, academic information, political affiliation information, employer information, salary information, business revenue information, tax revenue information, financial transaction information and any combination of the foregoing as well as other types of information not listed herein. Further, a user may employ the instance data 102 to conduct a background check of a person residing at the geographic locale. As such, the user may request that the persistence system 101 generate the semantic representation 104 using the instance data 102, and display the semantic representation 104 to the user via a GUI.

Further, in some embodiments, the user may provide contextual information to the persistence system 101, and the persistence system 101 may use the contextual information to generate or modify the semantic representation 104.

In one implementation, context information can be as simple as a query used to search or filter through instance data 102, identify relationships within instance data 102, or both so as to produce the semantic representation 104. For example, the user may provide context information such as, "background investigation" on the person, "John Smith," so as to indicate that the resultant semantic representation 104 will be employed to conduct a background investigation or a search for information associated with a background investigation of a particular person or persons.

As other examples, the user may provide one or more attributes of a particular person or a selected subject for the background investigation as context information. It follows that context information such as "authorship" about the person "John Smith" will yield a different semantic context form the prior example. Context information may also come from the user's role, job description or history of previous searches and therefore not be directly entered into the system by the user. Finally, context information from the user may be received as the user traverses the semantic representation 104 as will be described later.

Persistence 101 system may use the contextual information to organize, prune, and arrange the semantic representation 104. For instance, the persistence system 101 may determine the relevance or significance of a data structure within the semantic representation 104 based on the contextual information indicating that the user is performing a background investigation. In addition, as described in detail herein, the persistence system 101 may determine whether to display the data structure and where to display the data structure (in GUI 103) based upon the relevance or significance of the data structure.

As illustrated in FIG. 1, the instance data 102 may include a plurality of database entities 106(1)-(N). Further, the database entities 106(1)-(N) may be represented within the semantic representation 104 by the data structures 107(1)-(N) within the semantic representation 104. In some embodiments, the instance data 102 may be structured as a data table including the database entities 106(1)-(N), and the semantic representation of 104 may repurpose and reorganize the instance data 102 into a graph structure including a plurality of graph nodes and a plurality of graph edges connecting the graph nodes. Because the instance data 102 may be stored in a first type of data representation and the semantic representation 104 may be presented using a second type of data representation, the persistence system 101 may be configured to convert information from the first type of data representation to the second type of data representation. For instance, the persistence system 101 may be configured to convert a primary key or foreign key relationship in a relational database storing the instance data 102 to an edge in a graph implementation of the semantic representation 104. In addition, the persistence system 101 may be configured to aggregate data structures of a data representation. For instance, the persistence system 101 may be configured to merge a plurality of data elements of a first data representation into a single graph node in a second data representation.

The semantic representation 104 may include a focus node 108 representing a data structure of interest to the user. For instance, the focus node 108 may correspond to the subject of the background investigation as defined by the context information. Further, as illustrated in FIG. 1, the focus node 108 may include information from multiple database entities 106. For instance, the instance data 102 may store the name, date of birth, address, place of employment, job title, salary, and taxable income of the applicant in different database entities 106, and the focus node 108 may aggregate the information into a single graph node (i.e., the focus node 108) for visual consumption by the user in the semantic representation 104.

Additionally, the semantic representation 104 may include a plurality of semantic neighbor nodes 110(1)-(N) of the focus node 108. The semantic neighbor nodes 110(1)-(N) may be graph nodes including information having some relationship to the focus node 108. For example, the semantic neighbor node 110(1) may be a graph node corresponding to the employer of the subject represented by the focus node 108. Further, the semantic neighbor node 110(1) may include the name of the employer, the location of the employer, the yearly revenue of the employer, etc. In some embodiments, the name of the employer, the location of the employer, the yearly revenue of the employer may be stored in separate database entities 106 within the instance data 102.

In addition, the semantic representation 104 may include a plurality of semantic edges 112(1)-(N) connecting the focus node 108 and the semantic neighbor nodes 110(1)-(N). For example, the semantic edge 112(1) between the focus node 108 and semantic neighbor node 110(1) may indicate that the subject of the background investigation is employed at the employer. As another example, the semantic edge 112(2) between the semantic neighbor node 110(2) and the semantic neighbor node 110(3) may indicate employer is a retail company. Semantic neighbor node 110(4) may indicate information about a university from which the subject graduated.

Further, the user may provide additional or new context information by traversing the semantic edges 112(1)-(N) within the GUI 103 in order to explore the instance data 102 via the semantic representation 104. Additionally, the persistence system 101 may update the focus node as the user traverses the semantic representation 104, and apply graphical effects to the semantic neighbor nodes 110(1)-(N) and the semantic edges 112(1)-(N) as the user interacts with the semantic representation 104. For instance, the persistence system 101 may modify the visual attributes of a semantic edge 112 traversed by a user. As an example, the persistence may change the color or line thickness of a semantic edge 112 traversed by a user.

Further, as illustrated in FIG. 1, the semantic representation 104 may include a plurality of nodes 114(1)-(N) and a plurality of edges 116(1)-(N). In some embodiments, the persistence system 101 may determine a semantic context 120 (e.g., illustrated as semantic contexts 120A and 120B) of a focus node 108, which defines the semantic neighbor nodes 110(1)-(N) and the semantic edges 112(1)-(N) that are most relevant to the focus node 108, and defines the nodes 114(1)-(N) and the edges 116(1)-(N) as less or not relevant to the focus node 108. For example, the persistence system 101 may determine that individual relevancy scores of the plurality of nodes 114(1)-(N) and the plurality of edges 116(1)-(N) with respect to the focus node 108 fall below a relevancy threshold. As referred to herein, a "semantic context" may identify data structures having a relationship to another data structure (e.g. the focus node 108) that is of relevancy to a user, and indicate how the data structures should be positioned when displayed.

Two example semantic contexts 120A, 120B are illustrated in semantic representation 104. In the example illustrated, semantic context 120A may be broader than semantic context 120B. As illustrated, the semantic contexts 120A, 120B may communicate to a user that all the nodes and/or edges within the semantic contexts 120A, 120B is relevant (or more relevant) than everything outside of the enclosed semantic contexts 120A, 120B.

Further, the persistence system 101 may apply different visualization properties or graphical effects to the data structures within the semantic context of the focus node 108 (i.e., the semantic neighbor nodes 110(1)-(N) and the semantic edges 112(1)-(N)) and the data structures outside of the semantic context of the focus node 108 (i.e., the nodes 114(1)-(N) and edges 116(1)-(N)). For example, in some embodiments, the nodes 114(1)-(N) and the edges 116(1)-(N) that are outside of the semantic contexts 120A and/or 120B may not be presented within the GUI 103. In some other examples, the size of the nodes 114(1)-(N) and the edges 116(1)-(N) that are outside of the semantic contexts 120A and/or 120B may be smaller than the size of the semantic neighbor nodes 110(1)-(N) and the semantic edges 112(1)-(N) that are outside of the semantic contexts 120A and/or 120B. In an embodiment, the sizes or visual properties of the objects displayed inside of semantic context 120B may differ from those that are display outside of semantic context 120B and inside semantic context 120A.

In yet still some examples, the nodes 114(1)-(N) and the edges 116(1)-(N) may be partially displayed or otherwise have their visibility reduced (e.g., grayed out, displayed with dotted lines, etc.) in relation to nodes and edges that are within the semantic context 120A and/or 120B. Consequently, the GUI 103 will be decluttered as the user will only be presented information likely to be of relevance to their objective, simplify navigation steps across the semantic representation 104, and the user will not be required to perform awkward and cumbersome operations to navigate the semantic representation 104.

In some embodiments, the persistence system 101 may determine the semantic context based at least in part on node relevance information, edge relevance information, the number of nodes within the semantic representation 104, one or more nodes identified as being of interest, user activity (e.g., a traversal path over the semantic representation), and one or more properties of the data structures 107(1)-(N). Some examples of properties include node classes, edge classes, class categories, edge categories, edge weights, node labels, edge labels, dates of creation, and modification dates.

In some embodiments, the persistence system 101 may determine edge relevance information based at least in part on user interest (e.g., whether the node pertains to the user-provided context information), or historic user behavior (e.g., whether the user has previously traversed the edge or another edge having shared properties with the edge). In some embodiments, the persistence system 101 may determine node relevance information based on application of a semantic filter (e.g., whether the node has been bookmarked or pinned), the relevance of edges connected to the nodes, the significance of a node type (e.g., a node related to financial information) to an attribute of a user (e.g., a user with an accountant role), or historic user behavior.

In some embodiments, the persistence system 101 may employ machine learning techniques and/or pattern recognition techniques to determine semantic representation 104, the edge relevance information, the node relevance information, or the semantic context. For instance, the persistence system 101 may utilize hidden Markov models, decision trees, regression models, support vector machines, or artificial neural networks for determining which of data structures to present within the GUI 103 in response to selection of the focus node 108. Additionally, in some instances, the historic user activity may include user activity collected with respect to multiple users of the persistence system 101.

In some embodiments, the persistence system 101 may determine edge relevancy information based on a relationship between an edge type of an edge and user attributes of a user. For instance, the persistence system 101 may define a set of interests (e.g., criminal history, financial history, employment history, etc.), and determine a significance score for each interest for a user attribute, e.g., the user's role as a background investigator. Further, the persistence system 101 may define a set of edge types (e.g., "employed as", "employed by", "lives in", etc.), map the edge to an edge type, and determine a relevance score of each edge type for an interest. Further, the persistence system 101 may determine the relevance score of an edge to the user based on the significance score, the relevance score of the edge types, and/or an attribute of the user. In addition, the persistence system 101 may determine the node relevancy of a node based on the relevancy scores of the edges connected to the node. For example, the persistence system 101 may include a node in the semantic context based on determining that the relevancy scores of the edges connected to the node are above a threshold. As another example, the persistence system 101 may include a node in the semantic context based on determining that the relevancy scores of a particular amount of edges connected to the node are above a threshold.

In some other embodiments, the persistence system 101 may determine node relevancy based on a relationship between a node and attributes of a user. For example, the persistence system 101 may define a set of interests and determine a significance score for each interest for a user attribute, e.g., the user's role as a background investigator. Further, the persistence system 101 may determine the relevance score of the node for each interest. In addition, the persistence system 101 may determine the relevancy score of a node based on the significance score, the relevance score for each interest, and/or the interest of the user. Additionally, in some embodiments, the persistence system 101 may determine the relevancy score of a node based on the relevancy of the edges connected to the node.

Further, as the user navigates the semantic representation 104 by updating the focus node 108, the persistence system 101 determines the semantic context for the newly selected focus node and displays the data structures 107 of the newly determined semantic context within the GUI 103. Consequently, a node 114 may become a semantic neighbor node 110 when the user selects new the focus node while traversing the semantic representation and a semantic neighbor node 110 may become a node 114 when the user selects the new focus node while traversing the semantic representation.

In addition, in some embodiments, the semantic context may also define the position of the focus node 108, the semantic neighbor nodes 110(1)-(N), and/or the nodes 114 within the GUI. In some embodiments, the focus node 108 may be positioned in the center of the GUI. Further, the persistence system 101 may position the semantic neighbor nodes 110(1)-(N) based at least in part on one or more properties of the node. Some examples of properties include node class, edge class, class category, edge category, edge weight.

In some embodiments, the persistence system 101 may determine the position of a node, e.g., the semantic neighbor node 110(2), by defining a plurality of data categories (e.g., financial information, user data, local information, tax information, etc.) and assign each data category to an area within the GUI 103 (e.g., upper portion of the GUI, lower portion of the GUI, left portion of the GUI, right portion of the GUI). As such, a user may be able to predict with ease the location of nodes having particular information within the GUI 103. Further, the persistence system 101 may determine the significance of an interest for an attribute of the user and determine the relevancy score for the node for each data category. Next, the significance score and relevancy score may be used to determine the direction of the semantic neighbor node relative to the focus node. For example, the persistence system 101 may determine that the semantic neighbor node 110(2) should be displayed below the focus node 108 based on the significance score and the relevancy score indicating that the semantic neighbor node 110(2) is better classified as related to the data category associated with the lower portion of the GUI 103. Further, the persistence system 101 may determine a distance between the semantic neighbor nodes 110(1)-(N) and the focus node 108, and apply a collision avoidance method to ensure that there is no overlap in the GUI 103 between the data structures 107 within the semantic context. In some embodiments, the distances may be determined based at least in part on the amount of hops between the focus node and a semantic neighbor node 110.

Figure 2:
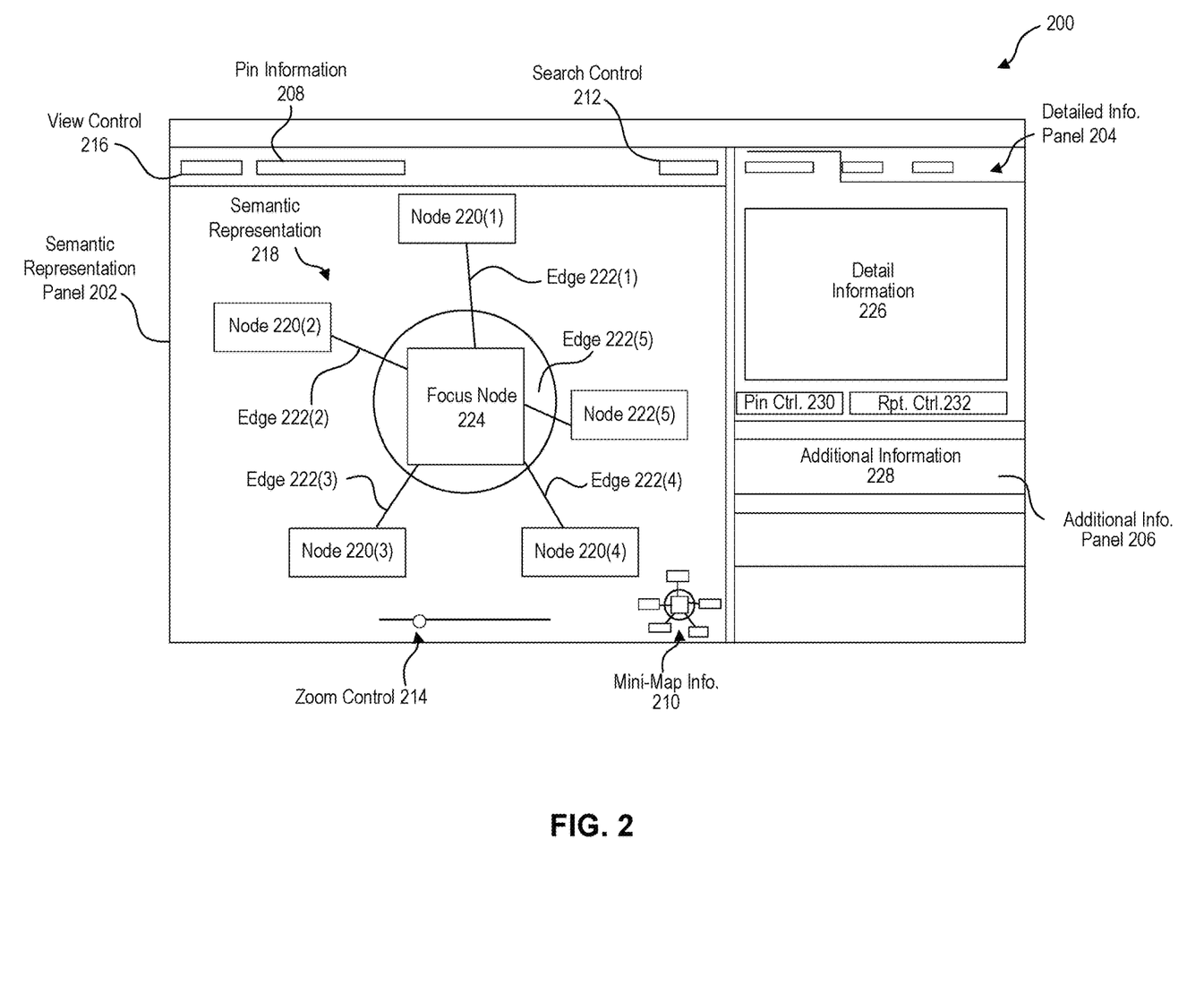
FIG. 2 illustrates an example graphical user interface for implementing semantic discovery, according to embodiments of the present disclosure.

FIG. 2 illustrates an example GUI for implementing semantic discovery, according to embodiments of the present disclosure. As illustrated in FIG. 2, a persistence system 101 may present the GUI 200 for implementing semantic discovery. The GUI 200 may include a semantic representation panel 202, a detailed information panel 204, an additional information panel 206, pin information 208, mini-map information 210, a search control 212, a zoom control 214, and a view control 216.

The semantic representation panel 202 may be configured to display an interactive semantic representation 218 (e.g., which may include one or more semantic contexts 120A, 120B). Being "interactive" means that a user can direct a sequence of inputs like a mouse clicks, drag and drop actions, touch gestures, pointer positioning on to the semantic representation 218 to modify a view of the semantic representation 218. In some instances, a user may employ interactive user input to navigate the semantic representation 218. For example, a user may employ a user input device (e.g., mouse, keyboard, touch screen, etc.) to traverse the data structures of the semantic representation 218.

In some embodiments, the semantic representation 218 may be a graph structure including a plurality of nodes 220(1)-(N) and a plurality of edges 222(1)-(N). Further, as described in detail herein, the user may select a focus node 224 from the plurality of nodes 220(1)-(N), and the persistence system 101 may determine a graphical representation of the data based on or centered around the focus node 224. In addition, the persistence system 101 may display the focus node 224, the nodes 220(1)-(5) within a particular semantic context (e.g., the semantic neighbor nodes of the focus node) of a semantic representation 218, and the edges 222(1)-(5) within the semantic context or semantic representation 218 (e.g., the semantic edges of the focus node), as described in detail with respect to FIGS. 1, 3, and 5. Further, the user may traverse thru the semantic representation 218 by selecting one of the nodes 220(1)-(5) as the new focus node. In addition, the persistence system 101 may update the semantic context or semantic representation 218 by selecting a new focus node, and may display the nodes and the edges of newly selected focus node 224.

In an embodiment, semantic context may be a subset of a greater overall or displayed example semantic representation 218 of various nodes and edges derived from a database system (as illustrated in FIG. 1, wherein semantic contexts 120A, 120B may be subsections of the displayed semantic representation 104). Persistence system 101 may graphically display a semantic representation 218 of a portion of the database system, which may include any number of semantic contexts.

The detailed information panel 204 may be configured to display detailed information 226 corresponding to the focus node 224. For instance, the focus node 224 may correspond to the subject of a background check, and the focus node 224 may include a concise description of the subject. For example, the focus node 224 may include the name of the subject, the date of birth of the subject, and the place of employment of the subject. Further, the detailed information may include a more detailed description of the subject. As an example, the detailed information 226 may include any information corresponding to the subject that is stored in the instance data represented by the semantic representation 218. Examples of detail information 226 possibly relevant to a background check may include information such as home address and education experience. The additional information panel 206 may be configured to display additional information 228 that the persistence system may find helpful to a user consuming the semantic representation 218. Examples of additional information possibly relevant to a background check may include information related to previous employers, previous addresses and any awards or honors bestowed upon the subject of focus node 224.

The pin information 208 may be a GUI control that presents a plurality of nodes that have been identified by the user as being of note. For example, a user may select a particular node 220, and choose a menu or other visual interface option to pin the selected node. In an embodiment, a user may also enter notes using a keyboard or audio message or voice command as to why the user pinned the selected node. Pin information 208 may indicate whether a textual, graphic, or audio note exists for the various pins. Further, the persistence system 101 may employ the pin information 208 as a semantic filter to determine the semantic context of a focus node 224. For example, the user may use the pin control 230 to add a node to the pin information or notes, and the persistence system 101 may filter nodes or edges that are unrelated to the pinned node from the semantic representation or the semantic context of a focus node.

In an embodiment, the mini-map information 210 may display a graphical element indicating the location of different of categories of information within the semantic representation panel 202. In other words, multiple neighboring nodes 220 may share a common category. As an example, a person with multiple prior employers, where each individual employer is represented by its own node 220, may be grouped together in a region of the GUI 103 (e.g., lower right corner) because they are in the same category of "employer." Further, the persistence system 101 may employ the mini-map information 210 to indicate to a user the location of the focus node 224 within the semantic representation 218 and its corresponding category. Further details of the mini-map 210 will be explained with respect to FIG. 4.

The search control 212 may provide search functionality over the semantic representation 218. For example, the user input a text string into the search control 212, and the persistence system may return search results within the semantic representation panel 202, the detailed information panel 204, or additional information panel 206. Further, the zoom control 214 may be a slider control that zooms in and out on the semantic representation 218 so that the user can focus on areas of particular interest.

In addition, the view control 216 may be used to toggle between different views or modes. For instance, the view control 216 may be used to switch a view of the instance data related to the semantic representation 218. Additionally, or alternatively, the view control 216 may be used to switch to a user interface for editing the semantic representation 218 or the instance data related to the semantic representation 218.

Further, as illustrated in FIG. 2, the GUI 200 may include a report control 232 configured to add the focus node 224 to a collection of bookmarked nodes. In an embodiment, a bookmark may enable quick access to various nodes across a database, which may be focus nodes 224. Each bookmarked node may include pinned nodes that are of particular interest or note relative to the semantic context 218 corresponding to the selected bookmarked node. In some embodiments, the persistence system 101 may generate a report including links to the bookmarked nodes. Further, users may select a link of a bookmarked node within the report, and the persistence system 101 may display the bookmarked node within the semantic representation panel 202. In some example, the collection of bookmarked nodes or the report may be employed to share nodes of interest between users or revisit nodes of interest at a later time.

Figure 3:
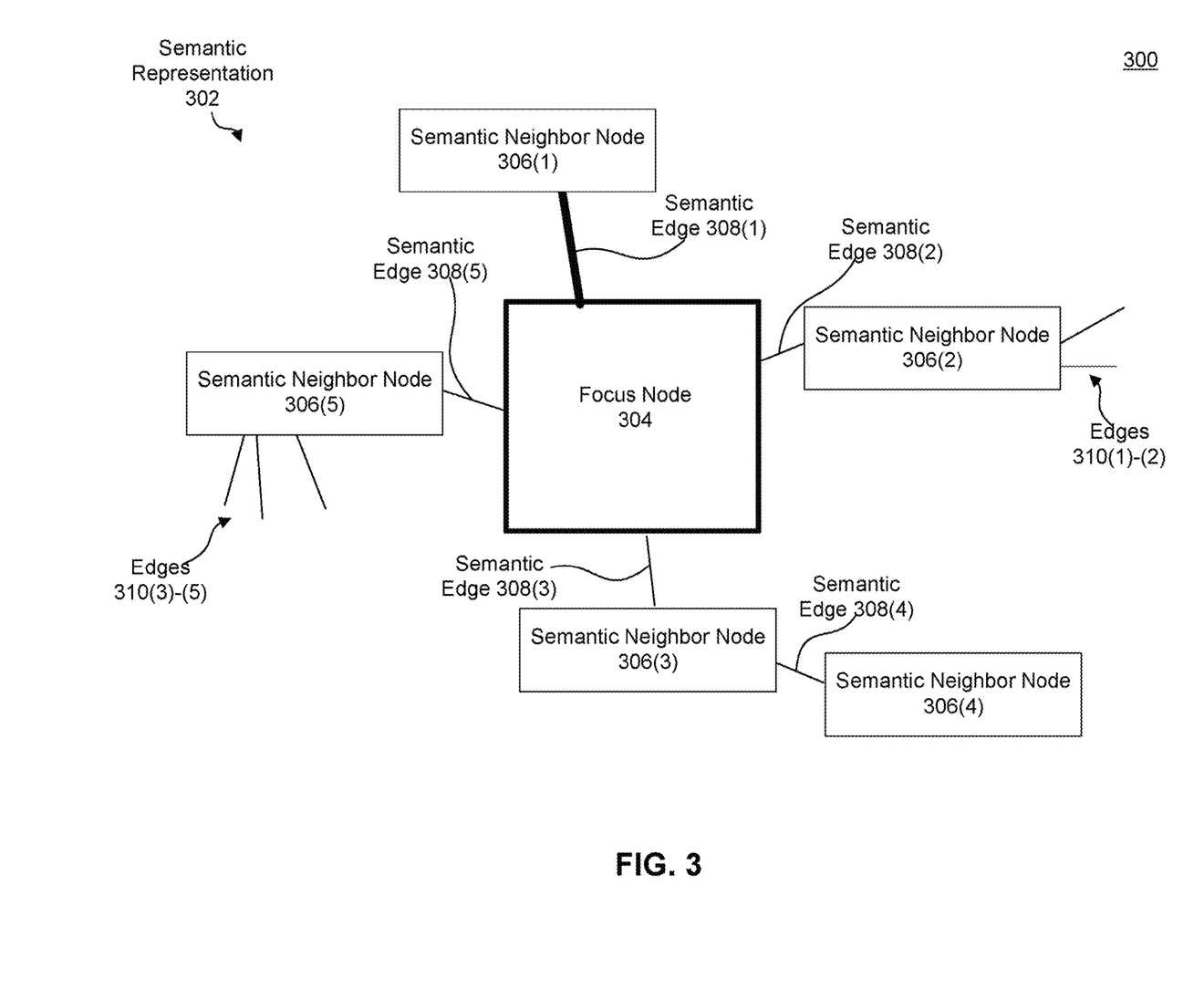
FIG. 3 illustrates an example graphical user interface element for implementing semantic discovery, according to embodiments of the present disclosure.

FIG. 3 illustrates an example semantic representation for implementing semantic discovery, according to embodiments of the present disclosure. As illustrated in FIG. 3, a semantic representation 302 may include a focus node 304, a plurality of semantic neighbor nodes 306(1)-(5), a plurality of semantic edges 308(1)-(5), and a plurality of edges 310(1)-(5). As described in detail herein, a persistence system 101 may display an example semantic representation 302 of a database in a GUI 103. In an embodiment, a particular database or dataset may include a semantic representation 302 of the data indicating that there are various nodes and edges. The semantic representation 302 may include any number of semantic contexts, which may be particular selections of the greater database semantic representation 302. In an embodiment, the semantic representation 302 and/or each semantic context of the greater semantic representation 302 may include or define the nodes and edges that may be displayed within the GUI 103, the position of the nodes and edges that will be displayed within the GUI 103, and any graphical effects that will be applied to the plurality of nodes and edges within the GUI 103.

For example, the semantic representation 302 may include census and tax information for a geographic locale. Further, the focus node 304 may correspond to a subject of a background investigation, and the persistence system 101 may determine that the semantic neighbor nodes 306(1)-(5) are a part of a semantic context based on their relevance to the act of performing a background check on the subject, or that a subset of the nodes such as 306(3) and 306(4) may be related to work history information of a subject of focus node 304.

In an embodiment, the semantic neighbor node 306(1) may correspond to the tax information of the subject, the semantic neighbor node 306(2) may correspond to the profession of the subject, the semantic neighbor nodes 306(3)-(4) may correspond to the employer of the subject and the employer's parent company, and the semantic neighbor node 306(5) may correspond to the neighborhood where the subject resides. Further, the semantic edges 308(1)-(5) may connect the focus node 304 and the semantic neighbor nodes 306(1)-(5). In another embodiment, semantic representation 302 may include additional nodes that may relate to former employers of the subject which may be grouped within the same semantic context as the employer nodes 306(3) and 306(4).

As illustrated, in some embodiments, the persistence system may apply graphical effects to the semantic neighbor nodes 306(1)-(5), the semantic edges 308(1)-(6), the edges 310(1)-(5). For example, as illustrated in FIG. 3, the semantic edge 308(1) may have a larger line thickness to represent that the user has traversed the edge and previously selected the semantic neighbor node 306(1) as the focus node. As another example, the edges 310(1)-(5) may not be connected to nodes on both ends to indicate that the edges 310(1)-(5) do not belong to the semantic context and/or connected to nodes that do not belong to the semantic context.

Figure 4:
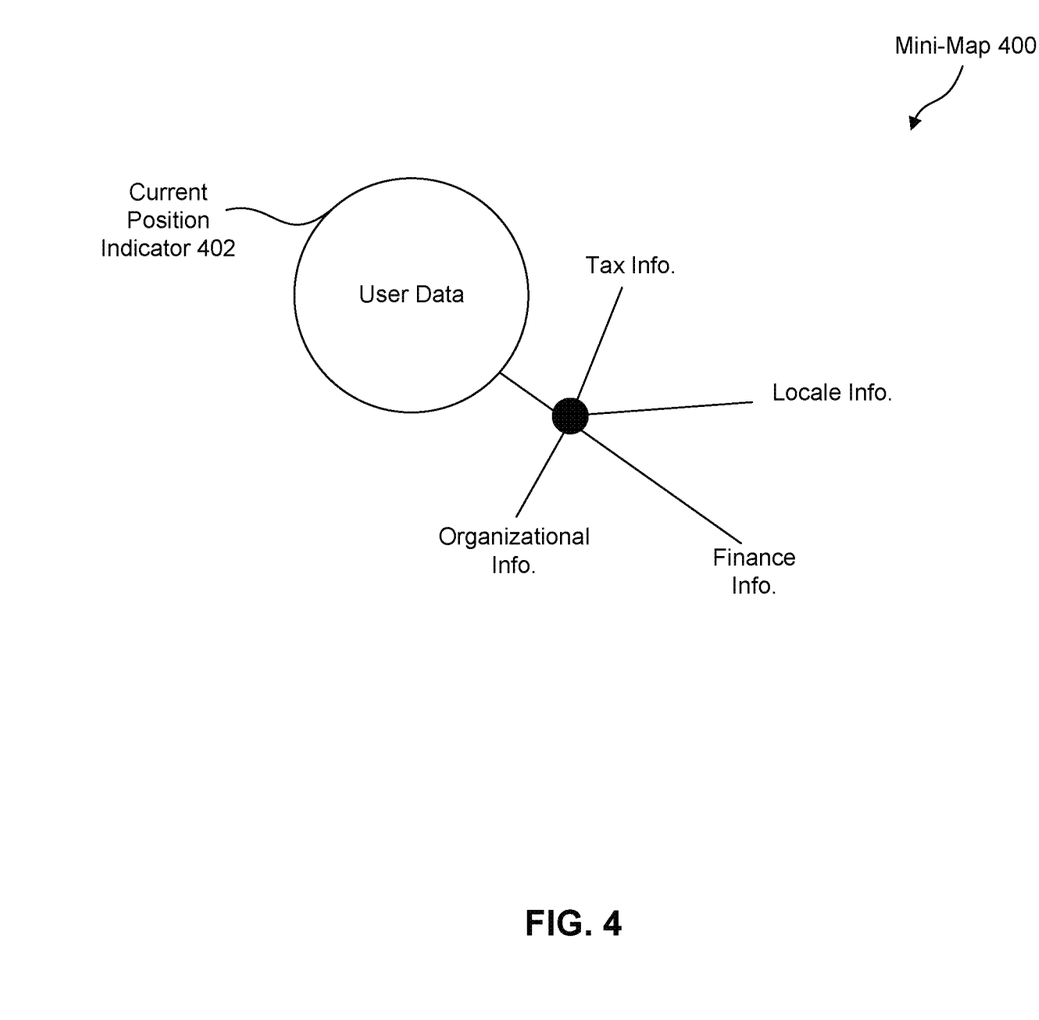
FIG. 4 illustrates an example graphical user interface element for implementing semantic discovery, according to embodiments of the present disclosure.

FIG. 4 illustrates an example mini-map for implementing semantic discovery, according to embodiments of the present disclosure. In an embodiment, a mini-map may be a miniature representation of a semantic representation (e.g., the semantic representations 104, 218, 302). In another embodiment, as illustrated in FIG. 4, a mini-map 400 may indicate the area of the GUI 103 for a particular type of data within the graphical display of either a semantic representation or semantic context. For instance, the mini-map 400 may indicate that organization data within the semantic representation may be grouped together in the lower-left portion of the semantic representation whereas the tax information is generally presented above the focus node. In some embodiments, the positions of the various types of data may be standard across multiple semantic representations. In some other embodiments, the positions of the various types of data may be particular to the semantic representation. For example, a database administrator may set the area for an individual type of data within the semantic representation. As another example, the persistence system may employ a machine learning model to determine the types of data in the instance data, and assign the each type of data to an area within the semantic representation.

Further, the mini-map 400 may include a current position indicator 402 that indicates the location of a focus node within a semantic representation. For example, the current position indicator 402 may indicate that the focus node belongs to the user data information area of the semantic representation and is found in the upper left hand portion of the semantic representation in relation to the other categories of data.

Figure 5:
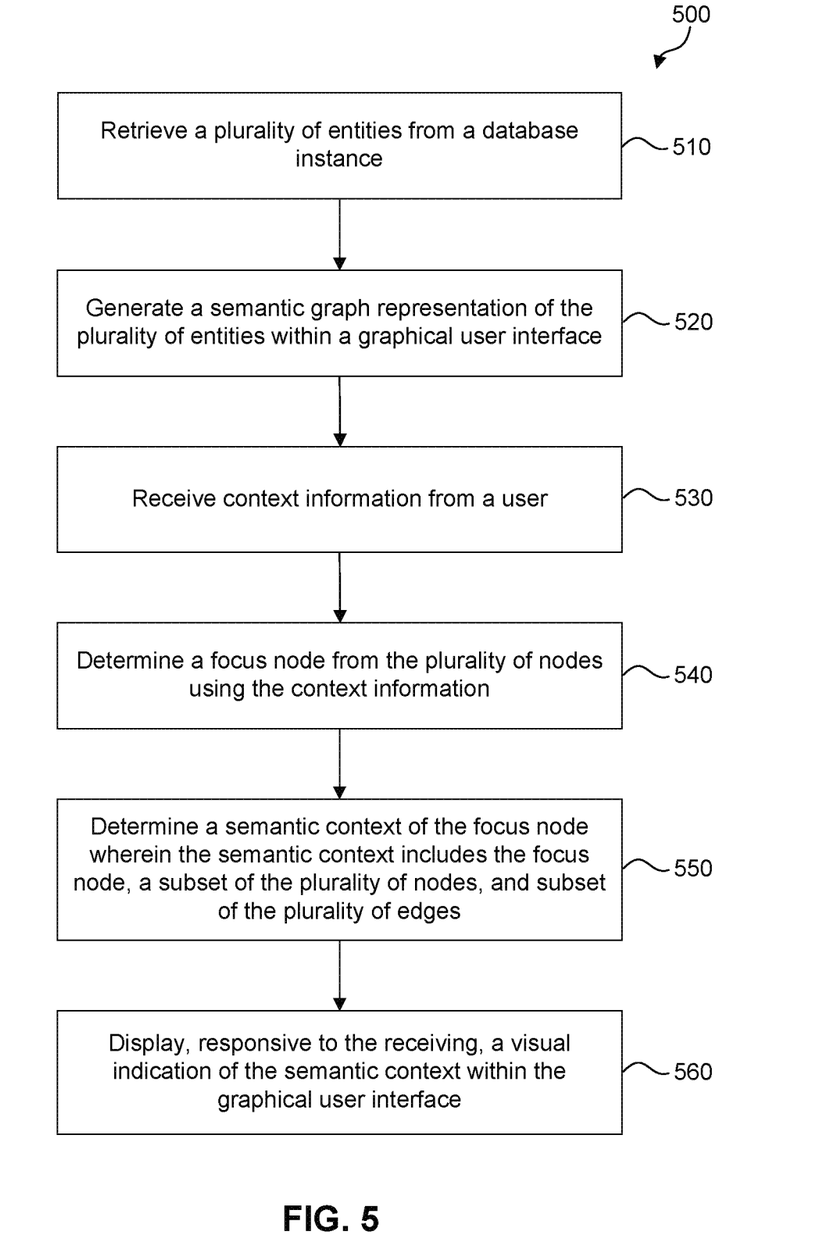
FIG. 5 is a flowchart illustrating a process for implementing semantic discovery, according to some embodiments.

FIG. 5 is a flowchart of a method 500 for implementing semantic discovery, according to some embodiments. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art. Method 500 shall be described with reference to FIG. 1. However, method 500 is not limited to the example embodiments.

In 510, a plurality of entities from a database instance are retrieved. For example, persistence system 101 may retrieve a subset of database entities 106(1)-(N) from a database. In an embodiment, the entities 106(1)-(N) may be retrieved responsive to a user request for a table, a request for a subset of records from a database, or a query.

In 520, a semantic graph representation of the plurality of entities is generated within a graphical user interface. For example, persistence system 101 may generate a visual representation of the various relationships between the selected or retrieved subset of data as a semantic representation 104 in a GUI 103.

In 530, context information is received from a user. For example, a user may select a particular node and designate it as a focus node or node of interest using a mouse-click or touch selection on a touch-screen monitor displaying GUI 103.

In 540, a focus node is determined from the plurality of nodes using the context information. For example, persistence system 101 may determine or designate the selected node as a focus node 108. In an embodiment, the focus node 108 may then be visually arranged to be within the center or near the center of the displayed semantic representation 104. In another embodiment, the focus node 108 may be visually highlighted, enlarged, or its visual appearance may otherwise be adjusted to indicate its designation.

In 550, a semantic context of the focus node is determined, wherein the semantic context includes the focus node, a subset of the plurality of nodes, and subset of the plurality of edges. For example, upon a selection of a node as focus node 108, persistence system 101 may generate, retrieve, or determine relationships between the focus node 108 and other nodes 114, 110. The semantic contexts 120A, 120B may be other designations of relationships that may have been system generated or requested by a user. For example, semantic context 120A may indicate those nodes that are associated with an educational history of a particular person associated with focus node 108, and semantic context 120B may be former teachers, professors, or mentors of the subject. While semantic context 120B is illustrated as a subset of semantic context 120A, in other embodiments may be a separate set of nodes with only focus node 108 overlapping.

In 560, a visual indication of the semantic context is displayed within the graphical user interface, responsive to the receiving. For example, while semantic contexts 120A, 120B are illustrated as an outline encompassing related nodes and edges, in other embodiments, the nodes and edges belonging to various semantic contexts 120A, 120B may share a same color (e.g., blue or red). A node that belongs to both semantic contexts may be illustrated as partly blue and partly red, or flashing blue and red, or may include another visual indication of the relationships between the nodes.

Figure 6:
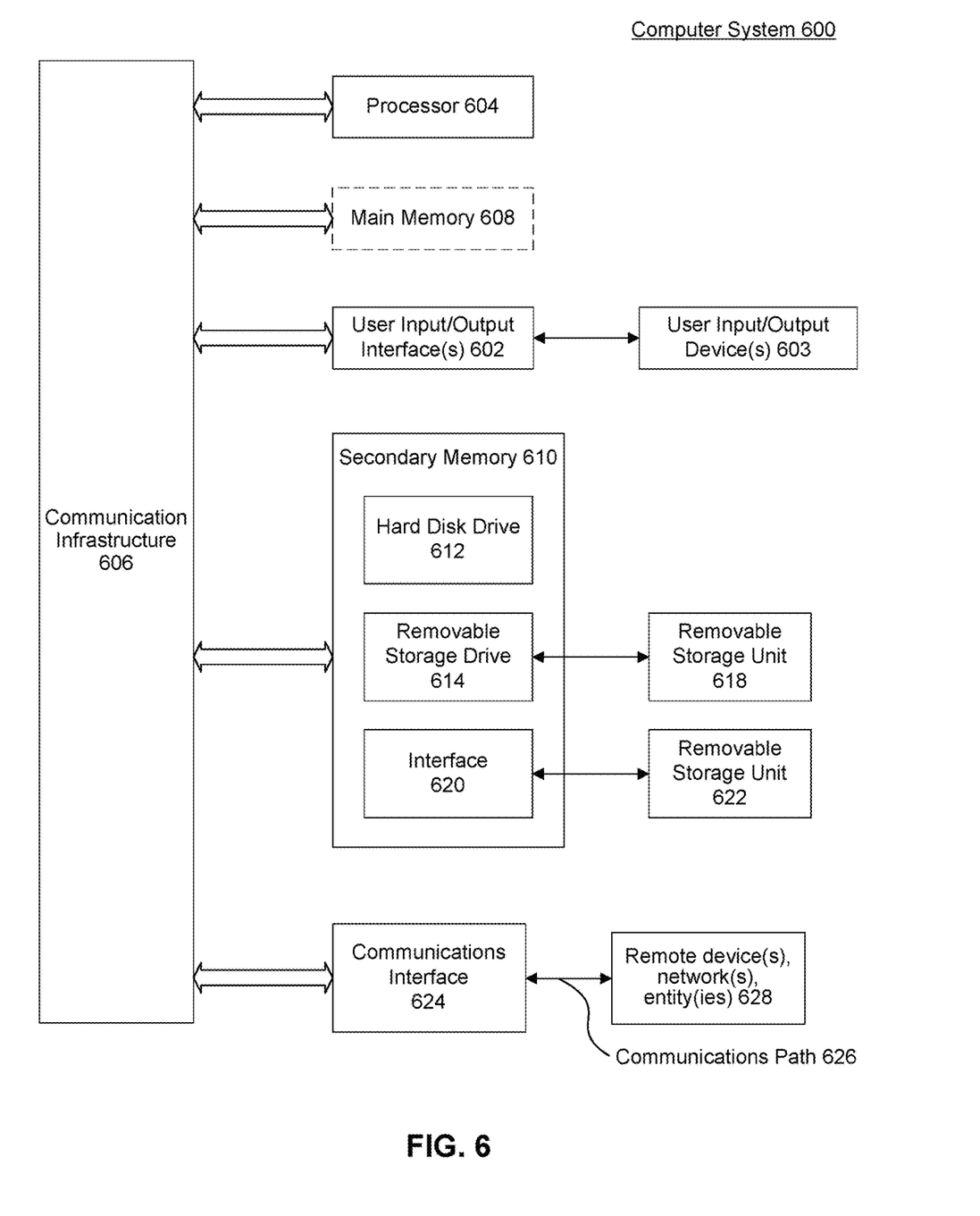
FIG. 6 is an example computer system useful for implementing various embodiments.

Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data. For example, the main memory may have stored therein control logic for performing the logic attributed to the persistence system herein. For example, in some embodiments, the main memory 408 may include a semantic representation generator for generating the semantic representation 104, and a semantic context generator for determining a semantic context.

Computer system 600 may also include one or more secondary storage devices or memory 610. Secondary memory 610 may include, for example, a hard disk drive 612 and/or a removable storage device or drive 616. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer usable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method comprising:

retrieving a plurality of entities from a database instance;

generating a semantic graph representation of the plurality of entities within a graphical user interface, wherein the semantic graph representation is comprised of a plurality of nodes and a plurality of edges connecting the plurality of nodes, wherein any pair of nodes that are relevant to each other are connected one or more of the plurality of edges;

receiving a query from the user, the query to be executed against the database instance;

receiving context information from a user, the context information comprising additional input from the user in addition to the query to be executed against the database instance, the context information indicating a relationship between entities retrieved from the database instance corresponding to the query and wherein the relationship is based on a first attribute of at least some of the entities retrieved from the database instance;

identifying, by one or more processors, a focus node from the plurality of nodes using the context information;

determining, by the one or more processors, a semantic context of the focus node wherein the semantic context includes the focus node, a subset of the plurality of nodes, and a subset of the plurality of edges, wherein the subset of nodes are determined to have relevancies to the focus node based on the first attribute and are connected to the focus node by the subset of the plurality of edges;

displaying, responsive to the receiving, a visual indication of the semantic context integrated within the semantic graph representation and encompassing two or more nodes of the plurality of nodes and a subset of plurality of edges connecting the two or more nodes, wherein the semantic context includes the focus node arranged near a center of the sematic context, the semantic context comprising relationship information between the two or more of the nodes that is of relevancy based on the first attribute;

detecting user behavior indicating that the user has previously traversed a first edge of the subset of the plurality of edges; and modifying one or more visual attributes of the first edge, based on the detecting the user behavior, the modified one or more visual attributes indicating that the user has previously traversed the first edge, relative to one or more visual attributes of a second edge of the subset of the plurality of edges, wherein the second edge is untraversed by the user.

2. The method of claim 1, wherein the receiving context information comprises:

receiving a selection of a one of the plurality of nodes of the semantic graph representation;

designating the selected one of the plurality of nodes as the focus node; and filtering the semantic representation based on the designated focus node.

3. The method of claim 2, further comprising:

receiving a selection of a different one of the plurality of nodes within the semantic graph representation; and highlighting one or more of the plurality of edges connecting the selected different node and the focus node.

4. The method of claim 1, wherein the at least one of the plurality of edges indicates an inferred relationship between two or more pieces of data of a database.

5. The method of claim 1, wherein the semantic graphic representation includes a plurality of semantic contexts including the focus node, wherein each of the plurality of semantic contexts includes a different combination of the plurality of nodes.

6. The method of claim 1, further comprising:

receiving an indication from the user to bookmark one of the plurality of nodes displayed in the graphical user interface; and including a bookmark for the one of the plurality of nodes in a bookmark section of the graphical user interface.

7. The method of claim 1, further comprising:

receiving, via the graphical user interface, a selection of one of the plurality of nodes;

retrieving, based on the selection, database information associated with the selected node; and displaying the database information in the graphical user interface.

8. The method of claim 1, wherein the focus node is a first focus node, the selection is a first selection, and further comprising:

determining a position of a subset of the plurality of nodes within the semantic graph representation, the subset of the plurality of nodes associated with a category;

displaying, via the graphical user interface, a map associating the position and category;

receiving a second selection of a second focus node from the plurality of nodes; and indicating, within the map, that the second focus node is associated with the category.

9. The method of claim 1, wherein the one or more visual attributes comprises modifying a line thickness of the first edge relative to a line thickness of the second edge.

10. The method of claim 1, the first attribute distinguishes between at least two data entries that have a similar second attribute.

11. The method of claim 1, wherein the context information comprising the additional input is visually displayed as a focus node in the semantic representation.

12. A system comprising:

a memory; and one or more processors and/or circuits coupled to the memory and configured to perform operations comprising:

retrieving a plurality of entities from a database instance;

generating a semantic graph representation of the plurality of entities within a graphical user interface, wherein the semantic graph representation is comprised of a plurality of nodes and a plurality of edges connecting the plurality of nodes, wherein any pair of nodes that are relevant to each other are connected one or more of the plurality of edges;

receiving a query from the user, the query to be executed against the database instance;

receiving context information from a user, the context information comprising additional input from the user in addition to the query to be executed against the database instance, the context information indicating a relationship between entities retrieved from the database instance corresponding to the query and wherein the relationship is based on a first attribute of at least some of the entities retrieved from the database instance;

identifying, by one or more processors, a focus node from the plurality of nodes using the context information;

determining, by the one or more processors, a semantic context of the focus node wherein the semantic context includes the focus node, a subset of the plurality of nodes, and a subset of the plurality of edges, wherein the subset of nodes are determined to have relevancies to the focus node based on the first attribute and are connected to the focus node by the subset of the plurality of edges;

displaying, responsive to the receiving, a visual indication of the semantic context integrated within the semantic graph representation and encompassing two or more nodes of the plurality of nodes and a subset of plurality of edges connecting the two or more nodes, wherein the semantic context includes the focus node arranged near a center of the sematic context, the semantic context comprising relationship information between the two or more of the nodes that is of relevancy based on the first attribute;

detecting user behavior indicating that the user has previously traversed a first edge of the subset of the plurality of edges; and modifying one or more visual attributes of the first edge, based on the detecting the user behavior, the modified one or more visual attributes indicating that the user has previously traversed the first edge, relative to one or more visual attributes of a second edge of the subset of the plurality of edges, wherein the second edge is untraversed by the user.

13. The system of claim 12, wherein the receiving context information comprises:

receiving a selection of a one of the plurality of nodes of the semantic graph representation;

designating the selected one of the plurality of nodes as the focus node; and filtering the semantic representation based on the designated focus node.

14. The system of claim 13, the operations further comprising:
    receiving a selection of a different one of the plurality of nodes within the semantic graph representation; and
    highlighting one or more of the plurality of edges connecting the selected different node and the focus node.

15. The system of claim 12, wherein the at least one of the plurality of edges indicates an inferred relationship between two or more pieces of data of a database.

16. The system of claim 12, wherein the semantic graphic representation includes a plurality of semantic contexts including the focus node, wherein each of the plurality of semantic contexts includes a different combination of the plurality of nodes.

17. The system of claim 12, the operations further comprising:
    receiving an indication from the user to bookmark one of the plurality of nodes displayed in the graphical user interface; and
    including a bookmark for the one of the plurality of nodes in a bookmark section of the graphical user interface.

18. A non-transitory computer-readable device having instructions stored thereon that, when executed by at least one computing device, cause the at least one computing device to perform operations comprising:
    retrieving a plurality of entities from a database instance;
    generating a semantic graph representation of the plurality of entities within a graphical user interface, wherein the semantic graph representation is comprised of a plurality of nodes and a plurality of edges connecting the plurality of nodes, wherein any pair of nodes that are relevant to each other are connected one or more of the plurality of edges;
    receiving a query from the user, the query to be executed against the database instance;
    receiving context information from a user, the context information comprising additional input from the user in addition to the query to be executed against the database instance, the context information indicating a relationship between entities retrieved from the database instance corresponding to the query and wherein the relationship is based on a first attribute of at least some of the entities retrieved from the database instance;
    identifying, by one or more processors, a focus node from the plurality of nodes using the context information;
    determining, by the one or more processors, a semantic context of the focus node wherein the semantic context includes the focus node, a subset of the plurality of nodes, and a subset of the plurality of edges, wherein the subset of nodes are determined to have relevancies to the focus node based on the first attribute and are connected to the focus node by the subset of the plurality of edges;
    displaying, responsive to the receiving, a visual indication of the semantic context integrated within the semantic graph representation and encompassing two or more nodes of the plurality of nodes and a subset of plurality of edges connecting the two or more nodes, wherein the semantic context includes the focus node arranged near a center of the sematic context, the semantic context comprising relationship information between the two or more of the nodes that is of relevancy based on the first attribute;
    detecting user behavior indicating that the user has previously traversed a first edge of the subset of the plurality of edges; and
    modifying one or more visual attributes of the first edge, based on the detecting the user behavior, the modified one or more visual attributes indicating that the user has previously traversed the first edge, relative to one or more visual attributes of a second edge of the subset of the plurality of edges, wherein the second edge is untraversed by the user.

19. The device of claim 18, wherein the receiving context information comprises:
    receiving a selection of a one of the plurality of nodes of the semantic graph representation;
    designating the selected one of the plurality of nodes as the focus node; and
    filtering the semantic representation based on the designated focus node.

20. The device of claim 19, the operations further comprising:
    receiving a selection of a different one of the plurality of nodes within the semantic graph representation; and
    highlighting one or more of the plurality of edges connecting the selected different node and the focus node.

* * * * *